United States Patent Office 2,977,570
Patented Mar. 28, 1961

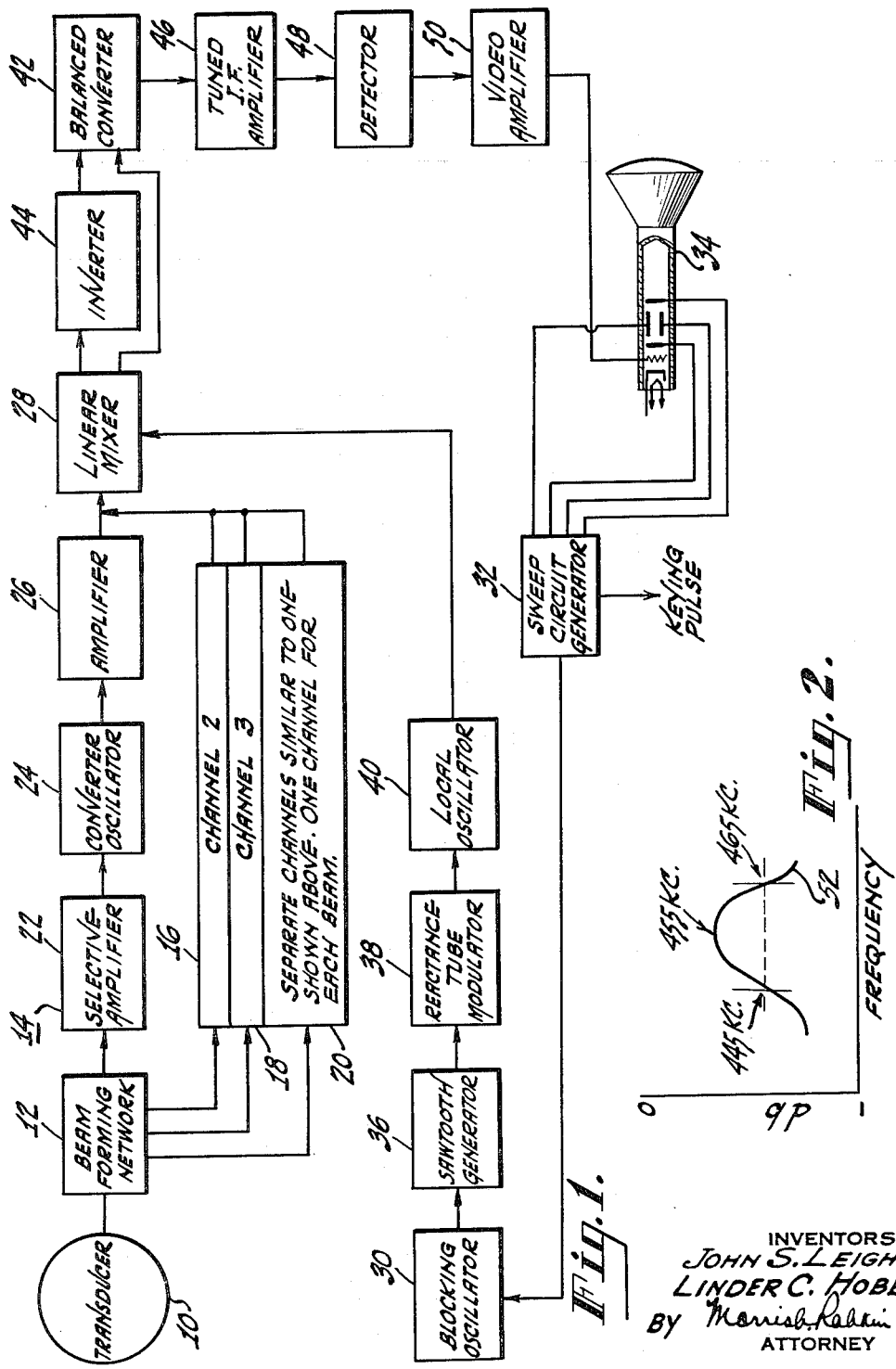

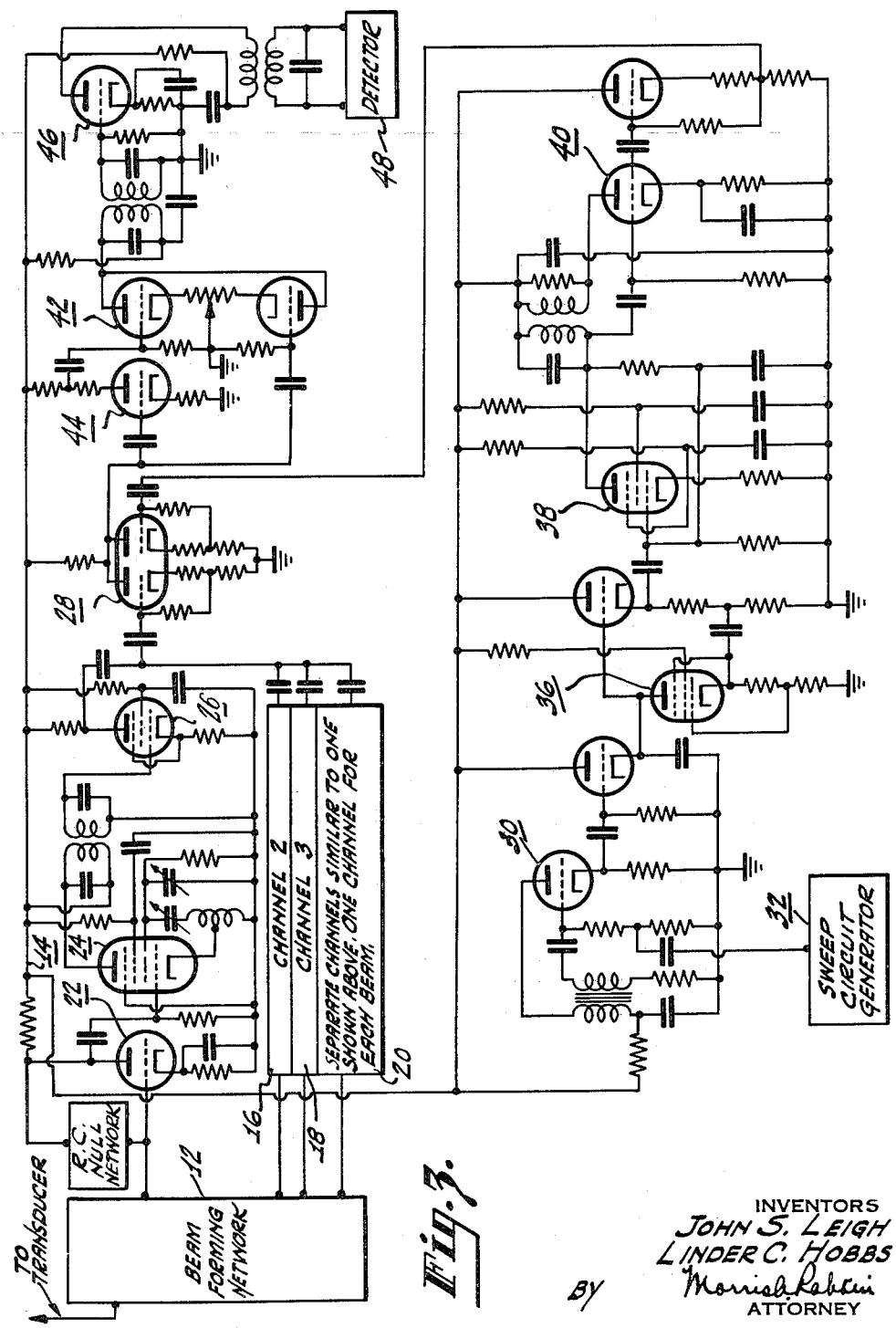

2,977,570
ELECTRONIC COMMUTATOR FOR SONAR SYSTEMS

John S. Leigh and Linder C. Hobbs, Haddonfield, N.J., assignors to Radio Corporation of America, a corporation of Delaware Filed Oct. 26, 1950, Ser. No. 192,326
5 Claims. (Cl. 340—6)

This invention relates to underwater sound ranging and detecting scanning systems and more particularly is an improvement in the receiver for such scanning systems.

Underwater sound ranging and detecting scanning systems or scanning sonar systems have been developed wherein a cylindrical transducer is used to transmit signals omnidirectionally and the omnidirectionally received signals from the transducer are used to provide directional information. The omnidirectional transducer actually consists of a number of staves or active transducing elements arranged about the periphery of a cylinder. Normally, signals are radiated and received in a circular pattern. When an echo signal having a plane wave front is directed at the transducer, the stave nearest the plane wave receives the plane wave signal first, the two staves on either side of this stave receive the plane wave signal next, and the two staves on either side of these two staves receive the plane wave signal still later. Thus each of the transducer staves, presented to the plane wave, receives a signal therefrom but delayed or advanced in time with reference to the signal received by the adjacent staves.

It will be readily appreciated that a plane wave impinging on a scanning transducer can convey directional information, if the time differences caused by the cylindrical transducer stave array can be compensated for, and the information received by all the staves presented to the plane wave is simultaneously displayed together with the direction of those staves relative to a reference position. Accordingly, time delays are introduced in circuit with the staves which are in inverse ratio to the time of signal reception and compensate for differences in such time. The stave receiving a plane wave signal first has a maximum time delay. The stave receiving the plane wave signal last has a minimum or no time delay. Thus electrically the plane wave is reformed after being broken up by the cylindrical transducer. Separate groups of adjacent staves around the transducer are connected to time delay circuits so that the output of each group is representative of a plane wave being received by that group. The effect of these time delays may also be viewed as effectively converting a section of the transducer, wherein these delays are provided, from a curved face to a flat face which is presented to the signal source. The time delayed or compensated output of each group of staves is known as a beam and transducers usually have beam-forming means to provide a number of beams around the diameter of the transducer. Each beam is scanned in rotation. By identifying the beam in which a signal occurs the direction from which that signal emanates may be readily determined.

The scanning or commutation of beams for an oscilloscope display is presently done by mechanical means wherein a rotating commutator samples the signals from each beam in rotation, or by electronic means wherein each beam is applied to a normally closed gate tube and each of these tubes is momentarily opened by sequential gating signals. For weight, space and speed of commutation considerations, the all-electronic commutating system is a more desirable one, yet for clarity in the display and interpretation of the signals it is most desirable to smooth the transition between beams, a feature which is presently obtainable only with the mechanical commutation system, unless an extremely elaborate electronic commutation system using specially tailored gating signals is employed.

It is therefore an object of the present invention to provide a new and novel electronic commutation system for use in scanning sonar systems.

It is a further object of the present invention to provide an electronic commutation system for use in scanning sonar systems which permits smooth transition between preformed beams.

It is still a further object of the present invention to provide an electronic commutation system for use in scanning sonar systems which permits smooth transition between preformed beams and is simpler than those known heretofore.

These and other objects of the present invention are achieved by converting the frequency of each beam to a different frequency, these converted beam frequencies being uniformly spaced, mixing these frequencies with those from a frequency modulated oscillator, applying the mixture to a balanced converter and then applying the output to a fixed bandpass filter. The filter passes a fixed center frequency with a minimum of attenuation. The successively attained fixed difference frequency between instantaneous values of the frequency modulated oscillator as it sweeps through its range and the mixture of converted beam frequencies successively reaches this fixed center frequency. The bandwidth of the filter is also sufficient to pass other difference frequencies, which are equally attenuated and are above and below the center frequency, by an amount which is equal to the difference between the converted beam frequencies. These side frequencies therefore include the information in the beams on either side of the beam being passed at the center frequency. In this manner the transition between beams is smooth. The output from the filter is applied to the viewing system for presentation on an oscilloscope. A synchronizing pulse from the indicator sweep circuit is used to synchronize the modulating frequency of the frequency modulating oscillator. Thus, identification of the beam being scanned is indicative of the direction from which the signal in the beam appears. The distance of the object providing the signal is obtained in the conventional manner by measuring the time of travel of the signal between the transducer and the object.

The novel features of the invention as well as the invention itself, both as to its organization and method of operation, will best be understood from the following description when read in connection with the accompanying drawings, in which Figure 1 is a block diagram of a portion of a scanning sonar receiving system which includes an embodiment of our invention, Figure 2 is a response curve of the tuned I.F. amplifier shown in Figure 1, and Figure 3 is a circuit diagram for one channel of the embodiment of the invention shown in Figure 1.

Referring now to Figure 1, there is schematically represented a cylindrical scanning transducer 10 which is connected, for receiving, to a beam-forming network 12. The number of staves in the transducer, the details of the beam-forming network 12 and the number of beams formed thereby are a matter of design. They are known in the art and require no detailed description. The beam-forming network 12 may be a group of lag lines or delay networks to which the groups of staves which are associated with each beam are connected. The output of the beam-forming network 12 is a number of beams each of which is applied to a separate channel 14, 16, 18 and 20. Each channel consists of a selective amplifier 22, the output from which is connected to a converter oscillator 24, the output from which is connected to an amplifier 26.

Each beam is amplified by the selective amplifier 22 and applied to the converter oscillator 24 which converts the beam frequency to another frequency. Each of the converted beam frequencies are different from each other and this difference is a fixed amount. For example, each of the beam frequencies may be 25 kc. The first or reference beam may be converted to 300 kc. and the second to 310 kc., the third to 320 kc. and so on. If twenty-four beams are formed in the beam forming network then the last beam is converted to 530 kc. The output of each converter 24 is then separately amplified by an amplifier 26. The output from each amplifier 26 is then connected to a common input 28 of a single linear mixer where they are combined.

A blocking oscillator 30 is keyed by a signal from a sweep circuit generator 32. The sweep circuit generator 32 is connected to the horizontal and vertical deflecting plates of the cathode ray oscilloscope tube 34 which is used as an indicator. The blocking oscillator 30 oscillates at the rate at which it is desired to scan the beams. A sawtooth generator 36 is connected to the output circuit of the blocking oscillator output. The sawtooth generator 36 in turn causes a reactance modulator 38, to which its output is applied, to modulate the frequency of a local oscillator 40 connected to the reactance tube modulator output. Assuming the blocking oscillator frequency at 150 cycles per second, the sawtooth oscillator 36 generates waves at a frequency of 150 cycles per second and the reactance modulator 38 varies the local oscillator frequency at a 150 cycle rate. Assuming the local oscillator 40 unmodulated frequency at 870 kc., the reactance modulator varies the local oscillator frequency from 755 kc. to 985 kc. at a 150 cycle rate.

The frequency modulated output of the local oscillator 40 is applied to another input of the linear mixer 28 to be mixed linearly with all the beam frequencies. The output from the linear mixer is then applied to a balanced converter 42 with a portion of the output passing through an inverter 44 to be in proper phase for application to the balanced converter 42. The output of the balanced converter at any instant contains twenty-four frequencies each of which is the instantaneous local oscillator frequency minus the frequency of one of the beam channels. These are applied to a band pass filter consisting of a tuned intermediate frequency amplifier 46 whose band pass characteristics may be seen in Figure 2. The characteristic curve 52 shows that the filter passes 455 kc. with a minimum attenuation and 445 kc. and 465 kc. with the same attenuation. Thus, at any instant, only those channels are passed whose frequency is such that the difference of the instantaneous local oscillator frequency and the channel frequency lies within the pass band of the tuned I.F. amplifier. Commutation and smooth passage between beams is therefore achieved as the local oscillator frequency is swept through its range, and is combined with all the channel frequencies so that each beam in turn arrives at the intermediate frequency at a regular rate with the preceding beam gradually receding from the I.F. frequency and the succeeding beam gradually approaching the I.F. frequency. Thus, in effect, an "I.F. window" is passed along the series of beams cutting each one on in turn.

The output of the tuned I.F. amplifier 46 is applied to a detector 48. The detected output is applied through a video amplifier 50 to the intensity grid of the cathode ray tube 34.

The frequencies and number of beams used in the above description are recited by way of example only and are not to be construed as a limitation. The system is utilizable with other frequency values and numbers of beams.

Referring now to Figure 3 there may be seen a circuit diagram for the embodiment of the invention shown schematically in Figure 1. A selective amplifier 22, converter oscillator 24 and amplifier 26 for only one beam channel 14 is shown. It will be readily understood that for other channels, further selective amplifiers, converter oscillators and amplifiers are required and are connected between the beam forming network output and the linear mixer input. The selective amplifier 22 is an amplifier which is tuned to the beam frequency and eliminates noise. The converter oscillator 24 is a conventional converter stage. The converter output is applied to a tuned amplifier 26 which selects the desired converted beam frequency since the converter oscillator output includes sum and difference frequencies. The converted beam frequency selected is then applied to the grid of the linear mixer stage 28. The linear mixer is a dual triode whose output varies linearly with its input. Its output therefore contains no sum and difference frequencies. These are obtained from the balanced converter stage 42 to which the linear mixer is coupled. The frequency modulated oscillation system shown is known to the art and needs no further description. The tuned I.F. amplifier 46 is also conventional.

From the foregoing description, it will be readily apparent that an improved and simple system of smooth and rapid electronic commutation of a sonar scanning system has been provided. Although but a single embodiment has been shown and described, it should be apparent that many changes may be made in the particular embodiment herein disclosed, and that many other embodiments are possible, all within the spirit and scope of the invention. It is therefore desired that the foregoing description shall be taken as illustrative and not as limiting.

What is claimed is:

1. In a scanning sonar system having a substantially non-directional multielement transducer and means coupled to said transducer elements to form received signals into a plurality of fixed beams, an electronic commutation system for said beams comprising means to convert each of said beams to a different beam frequency, said converted beam frequencies differing from one another by fixed amounts, means to combine said converted beam frequencies, means to successively convert each of said converted beam frequencies in said combination to a single frequency, and means to detect said single frequency whereby said beams are sequentially scanned.

2. In a scanning sonar system having a substantially omnidirectional multielement transducer and means coupled to said transducer elements to form received signals into a plurality of fixed beams, an electronic commutation system for said beams comprising means to convert each of said beams to a different beam frequency, each of said converted beam frequencies differing from one another by a fixed amount, means to combine all said converted beams, means to generate frequency modulated oscillations, means to mix said combined beams and said frequency modulated oscillations, and means to successively select from the output of said last-named means a frequency substantially equal to the difference between predetermined instantaneous frequency values of said frequency modulated oscillations and each of said converted beam frequencies to successively scan each of said beams.

3. In a scanning sonar system having a substantially omnidirectional multielement transducer and means coupled to said transducer elements to form received signals into a plurality of fixed beams, an electronic commutation system for said beams comprising means to convert each of said beams to a different frequency, said converted beam frequencies differing from one another by fixed amounts, means to generate frequency modulated oscillations, means to mix said frequency modulated oscillations with all of said converted beams, and filter means connected to derive an output from said mixing means, said filter means being tuned to pass a midband frequency substantially equal to the difference between successive frequency values of said frequency modulated oscillations and successive ones of said converted beam frequencies and equally attenuated frequencies higher and lower than midband frequency, said equally attenuated frequencies being higher and lower than said midband frequency by an amount equal to the difference between said converted beam frequencies, whereby said filter means serves to successively and smoothly commutate said beams.

4. In a scanning sonar system having a substantially circular multielement transducer and means coupled to said transducer elements to form received signals into a plurality of fixed beams, an electronic commutation system for said beams comprising means to convert each of said beams to a different beam frequency, said converted beam frequencies differing from one another by a fixed amount, means to combine said converted beams, a frequency modulated oscillator, a linear mixer, means to apply said combined converted beams and the output of said frequency modulated oscillator to said linear mixer input, an inverter connected to receive an output from said linear mixer, a balanced converter connected to receive an output from said inverter, and a tuned amplifier connected to receive an output from said balanced converter, said tuned amplifier being tuned to pass a midband frequency substantially equal to the difference between successive frequency values in the output of said frequency modulated oscillator and successive ones of said converted beam frequencies and to pass equally attenuated frequencies above and below said midband frequency, said equally attenuated frequencies differing from said midband frequency by an amount equal to the difference between said converted beam frequencies whereby said beams are successively and smoothly commutated.

5. In combination, a scanning sonar system having a substantially omnidirectional multielement transducer, means coupled to said transducer elements to form received signals into a plurality of fixed beams, means to convert each of said beams to a different beam frequency, each of said converted beam frequencies differing from one another by a fixed amount, means to combine all said converted beam frequencies differing from one another by a fixed amount, means to combine all said converted beam frequencies, means to generate frequency modulated oscillations, means to mix said combined converted beams and said frequency modulated oscillations, filter means coupled to said last named mixing means, said filter means being tuned to pass a frequency substantially equal to the difference between the successive frequency values of said frequency modulated oscillations and successive ones of said converted beam frequencies, and to pass equally attenuated frequencies above and below said midband frequency, said equally attenuated frequencies differing from said midband frequency by an amount equal to the difference between said converted beam frequencies, means to display the output of said filter means on a time base and means to synchronize said time base with the modulating frequency of said frequency modulated oscillations.

References Cited in the file of this patent
UNITED STATES PATENTS

| | | |
|---|---|---|
| 1,889,597 | FitzGerald | Nov. 29, 1932 |
| 2,460,900 | Newbold | Feb. 8, 1949 |
| 2,494,370 | Swartzel et al. | Jan. 10, 1950 |